Oct. 1, 1946.  C. C. BROWN  2,408,507
STEERING DRIVE MECHANISM FOR DRIVEN WHEELS
Filed Oct. 20, 1944  2 Sheets-Sheet 1

Inventor
CLIFFORD C. BROWN,

By *Clarence A. O'Brien and Harvey B. Jackson*
Attorneys

Oct. 1, 1946.　　　　C. C. BROWN　　　　2,408,507
STEERING DRIVE MECHANISM FOR DRIVEN WHEELS
Filed Oct. 20, 1944　　　　2 Sheets-Sheet 2

Inventor
CLIFFORD C. BROWN,

By Clarence A. O'Brien
and Harvey B. Jacobson
Attorneys

Patented Oct. 1, 1946

2,408,507

UNITED STATES PATENT OFFICE 2,408,507

STEERING DRIVE MECHANISM FOR DRIVEN WHEELS

Clifford C. Brown, Clinton, Ohio

Application October 20, 1944, Serial No. 559,542

2 Claims. (Cl. 180—17)

The present invention relates to new and useful improvements in front wheel drives for tractors and other power driven vehicles and has for its primary object to provide a steering mechanism for the vehicle while the wheels remain in longitudinal alignment.

A further important object of the invention is to provide a steering front wheel drive without interrupting the power transmitted to each of the front drive wheels and in which the steering mechanism is operatively connected to the drive means of the wheel to selectively effect a lag in one of the wheels whereby to decrease the driving speed of one of the wheels and to increase the driving speed of the other wheel to cause the desired turning movement of the vehicle.

A still further object is to provide an apparatus of this character of simple and practical construction, which is efficient and reliable in performance, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figures 1, 2:
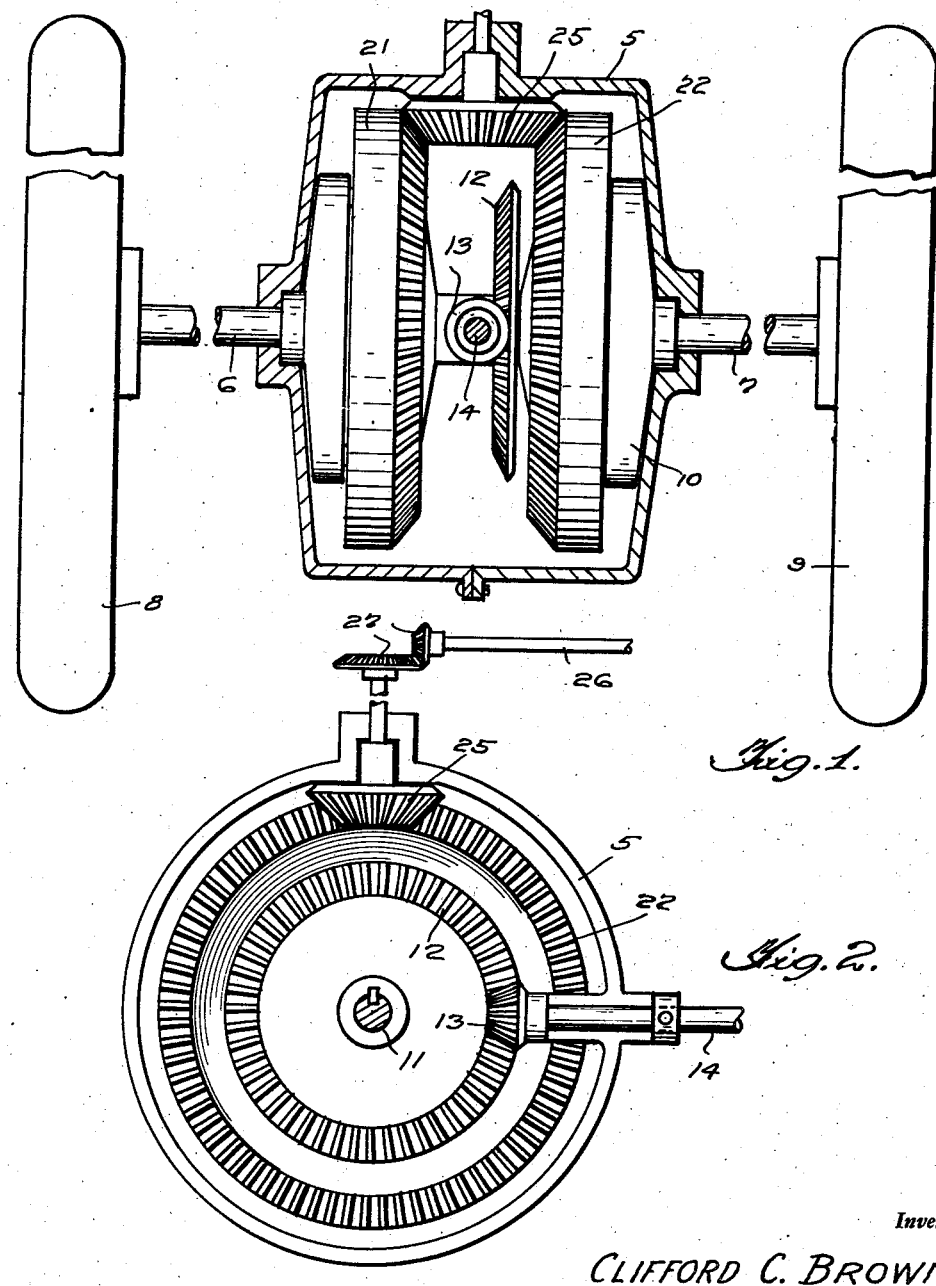
Figure 1 is a transverse sectional view through the gear housing for the front wheel drive.
Figure 2 is a view of the drive gears with one side of the housing removed.
Figure 3:
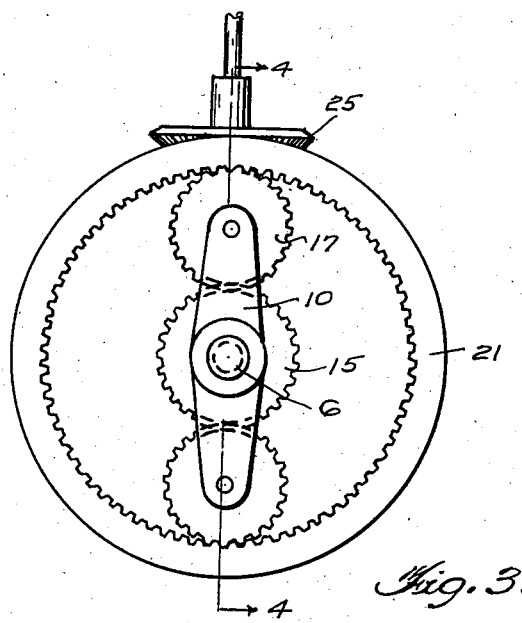
Figure 3 is a transverse sectional view taken substantially on the line 3—3 of Figure 4.
Figure 4:
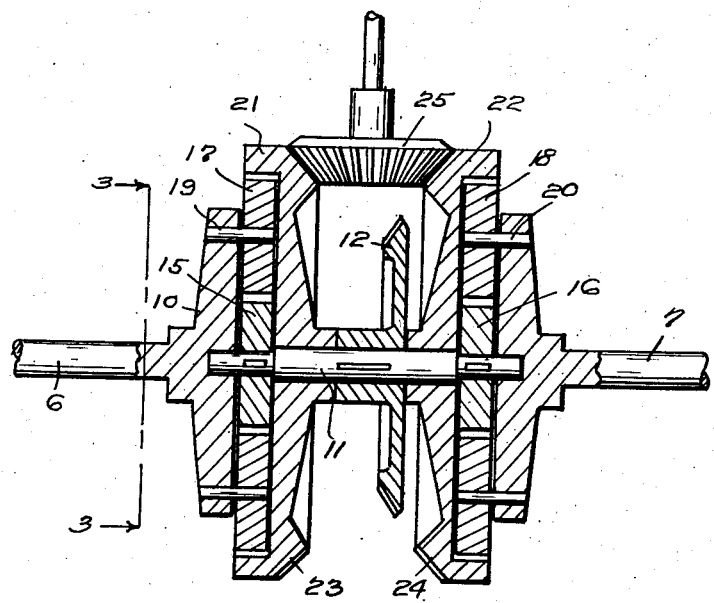
Figure 4 is a sectional view taken substantially on a line 4—4 of Figure 3.

Referring now to the drawings in detail wherein for the purpose of illustration I have disclosed a preferred embodiment of the invention, the numeral 5 designates a gear housing having the axles 6 and 7 journaled in the opposite sides thereof and to which the front wheels 8 and 9 are respectively connected.

Formed on the inner end of each axle is a carrier or cross head 10, the two cross heads having the ends of a shaft 11 journaled in the opposed faces thereof.

Keyed to the central portion of the shaft 11 is a ring gear 12 driven by a pinion 13 on a shaft 14 leading from the transmission mechanism of the vehicle, the shaft 14 being journaled in the housing 5 as shown in Figure 2 of the drawings.

Also keyed to the shaft 11 adjacent the ends thereof are spur gears 15 and 16, each of the spur gears being operatively engaged with a pair of planetary gears 17 and 18 freely journaled on pins 19 and 20 carried at the opposite ends of the carriers 10 for the respective axles.

Internal ring gears 21 and 22 are freely mounted on the shaft 11 at opposite sides of the ring gear 12 in engagement respectively with the planetary gears 17 and 18.

The opposed faces of the gears 21 and 22 are also formed with beveled gear teeth 23 and 24 engageable by a beveled gear 25 positioned between the gears 21 and 22 and operated by means of a steering shaft 26 through the gears 27.

In the operation of the device the axles 6 and 7 and the wheels 8 and 9 are driven through the carriers 10, the spur gears 15 and 16 and the planetary gears 17 and 18 by means of the shaft 11, ring gear 12, pinion 13 and transmission shaft 14 from the power plant of the vehicle.

The steering of the front wheels 8 and 9 is accomplished by subjecting one of said wheels to a lag accomplished through the operation of the steering shaft 26 and beveled gear 25 which rotates the gears 21 and 22 and which through the planetary gears 17 and 18 will decrease the speed of one of the wheels and increase the speed of the others of said wheels to thus accomplish the steering of the vehicle.

It is believed that the details of construction and manner of use of the device will be readily understood from the foregoing without further detailed explanation.

Having thus described the invention, what I claim is:

1. A steering drive mechanism for a pair of driven wheels and comprising axles for the wheels, a gear housing rotatably supporting the inner ends of the axles, a head on the inner end of each axle, a shaft journaled in respective heads in alignment with the axles, a driven gear secured to the shaft, planetary gears carried by the heads, gears secured to the shaft engaging said planetary gears, ring gears journaled on the shaft in engagement with the planetary gears, and means controlling the movement of said ring gears to effect an increase in the speed of one of the axles and a corresponding decrease in the speed of the other axle to produce a lag in the wheel attached to said last-named axle.

2. A steering drive mechanism for a pair of driven wheels and comprising axles for the wheels, a gear housing rotatably supporting the inner ends of the axles, a head on the inner end of each axle, a shaft journaled in respective heads in alignment with the axles, a driven gear secured to the shaft, planetary gears carried by the heads, gears secured to the shaft engaging said planetary gears, ring gears journaled on the shaft in engagement with the planetary gears, and a manually operable gear engaging both of said ring gears and adapted to effect an increase in the speed of rotation of one of the axles and a corresponding decrease in the speed of the other axle to produce a lag in the wheel attached to said last-named axle.

CLIFFORD C. BROWN.